(12) United States Patent
Vassallo

(10) Patent No.: US 7,836,823 B2
(45) Date of Patent: Nov. 23, 2010

(54) EGG BREAKER

(76) Inventor: Saviour Vassallo, 131 Riverside Dr., Apt. 4-C, New York, NY (US) 10024

( * ) Notice: Subject to any disclaimer, the term of this patent is extended or adjusted under 35 U.S.C. 154(b) by 475 days.

(21) Appl. No.: 11/978,674

(22) Filed: Oct. 30, 2007

(65) Prior Publication Data
US 2009/0107347 A1  Apr. 30, 2009

(51) Int. Cl.
*A47J 43/14* (2006.01)
(52) U.S. Cl. .................. 99/582; 99/571; 30/120.4
(58) Field of Classification Search .......... 99/495, 99/498, 568, 572, 574, 576, 579, 581, 582, 99/571, 509; 30/120.1, 120.3, 120.4; *A47J 43/14*
See application file for complete search history.

(56) References Cited

U.S. PATENT DOCUMENTS

| 355,316 A | | 1/1887 | Hartigan | |
|---|---|---|---|---|
| 696,016 A | | 3/1902 | Dotts | |
| 824,748 A | * | 7/1906 | Scheider | 30/120.1 |
| 1,254,326 A | * | 1/1918 | Hutchison et al. | 99/498 |
| 1,372,111 A | * | 3/1921 | Van Melsen | 30/120.1 |
| 1,409,649 A | * | 3/1922 | Becker | 99/498 |
| 1,590,813 A | | 6/1926 | Donovan | |
| 1,611,541 A | * | 12/1926 | McCrocklin et al. | 30/120.1 |
| 1,765,491 A | * | 6/1930 | Jones | 30/120.1 |
| 1,865,619 A | * | 7/1932 | Dammrich | 30/120.1 |
| 1,924,789 A | * | 8/1933 | Horvath | 30/120.1 |
| 2,130,623 A | * | 9/1938 | Hines et al. | 30/120.1 |
| 2,247,016 A | * | 6/1941 | Halas | 30/120.1 |
| 2,283,390 A | * | 5/1942 | Seldomridge | 294/64.1 |
| 2,314,741 A | | 3/1943 | Sigler | |
| 2,476,356 A | * | 7/1949 | Cook | 99/498 |
| 2,481,579 A | * | 9/1949 | Dolezal | 30/120.1 |
| 2,548,667 A | * | 4/1951 | Gruss | 30/120.1 |
| 2,612,921 A | * | 10/1952 | Tomola | 30/120.1 |
| 2,706,507 A | | 4/1955 | Bartell | |
| 2,729,254 A | | 1/1956 | McLaughlin | |
| 2,794,471 A | * | 6/1957 | Brackman et al. | 30/120.1 |
| 3,164,180 A | | 1/1965 | Leopoldi | |
| 3,320,987 A | * | 5/1967 | Pelzel | 99/578 |

(Continued)

*Primary Examiner*—Reginald L Alexander
(74) *Attorney, Agent, or Firm*—Michael de Angeli

(57) ABSTRACT

A tool for breaking and opening an egg comprises first and second complementary concave egg-receiving container members pivoted to one another at a first axis, and first and second concave egg-confining members each pivoted to one of the complementary concave egg-receiving container members at a respective axis parallel to the first axis. Egg-piercing points are formed on mating edges of the egg-receiving container members. In order to break and open an egg, the egg-receiving container members are first operated such that their mating edges are juxtaposed to one another, such that an egg-receiving cavity is formed therebetween. An egg is then placed in this cavity, and the egg-confining members are pivoted so as to confine the egg in the cavity. The tool and egg therein are then rapped sharply against a hard surface, such that the shell of the egg is pierced by the egg-piercing points, defining a separation line extending substantially circumferentially around the shell of the egg. The egg-receiving container members are then pivoted away from one another, by finger pressure applied to the egg-confining members. The eggshell then parts along the separation line, allowing the contents to be poured out. Because the eggshell parts neatly along the separation line, shell fragments do not tend to become mixed with the contents of the shell.

8 Claims, 2 Drawing Sheets

U.S. PATENT DOCUMENTS

| | | | |
|---|---|---|---|
| 3,494,397 A * | 2/1970 | Sparks | 30/120.1 |
| 3,857,327 A * | 12/1974 | Popeil | 99/499 |
| 4,068,573 A | 1/1978 | Romero | |
| 4,137,837 A | 2/1979 | Warren | |
| 4,137,838 A | 2/1979 | Warren | |
| 4,542,584 A * | 9/1985 | Talbot | 30/120.1 |
| 5,083,508 A * | 1/1992 | Banks et al. | 99/577 |
| 5,784,953 A * | 7/1998 | Wang | 99/499 |
| D413,492 S * | 9/1999 | Wang | D7/667 |
| 6,675,701 B2 * | 1/2004 | Christiansen | 99/582 |
| 2007/0251096 A1 * | 11/2007 | Smith | 30/120.5 |
| 2009/0277013 A1 * | 11/2009 | Tesner et al. | 30/120.1 |

* cited by examiner

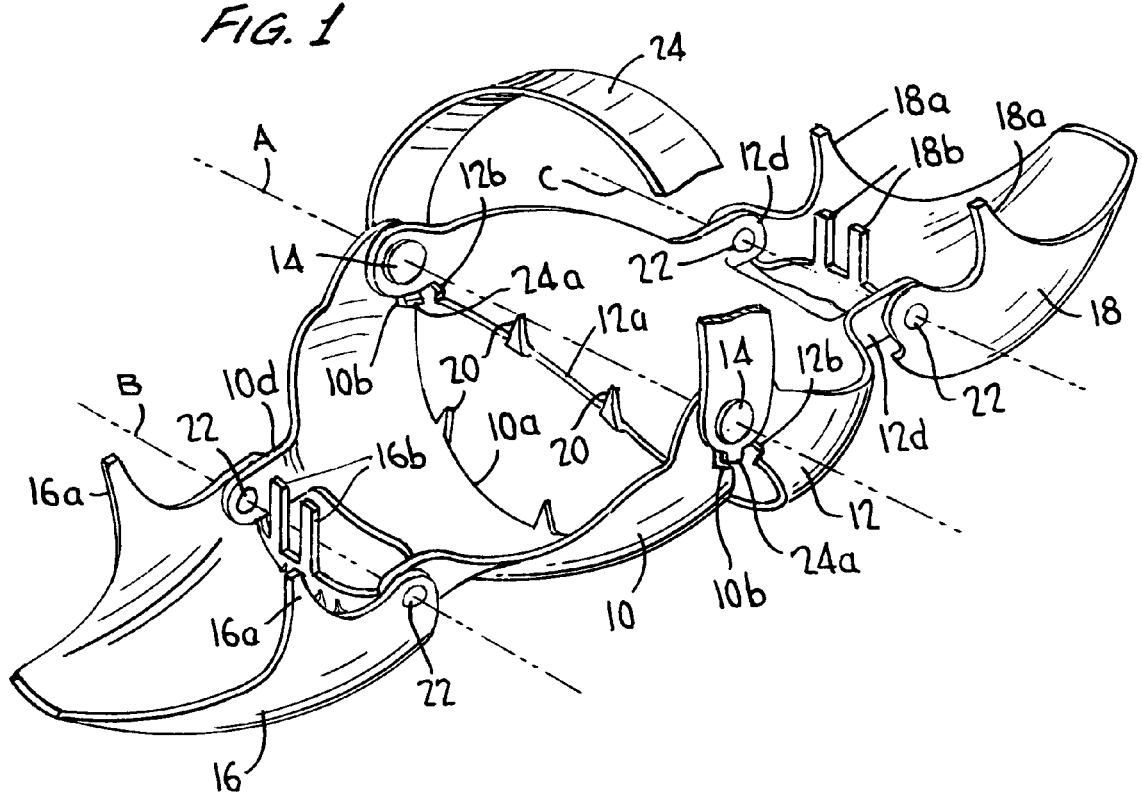
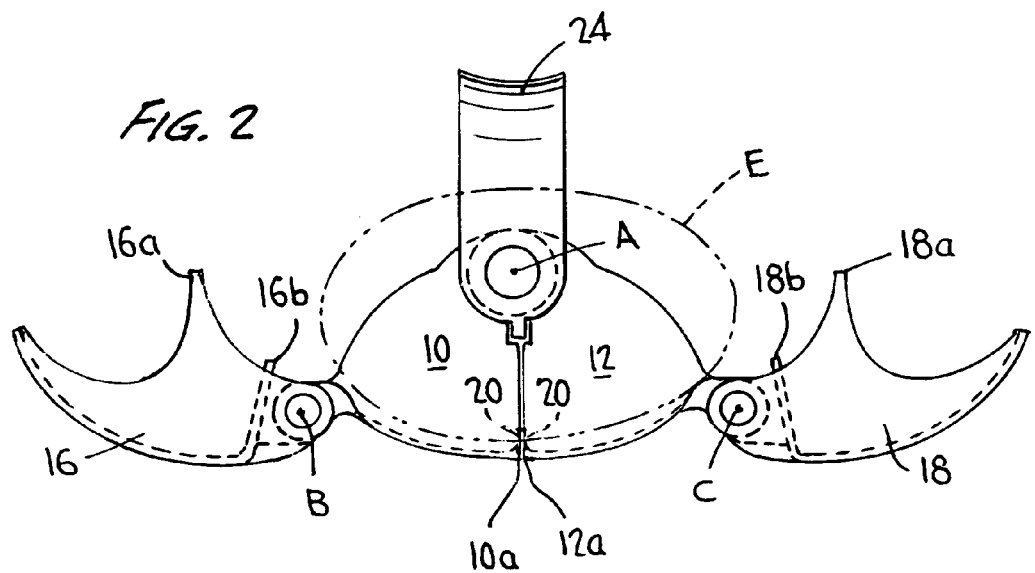

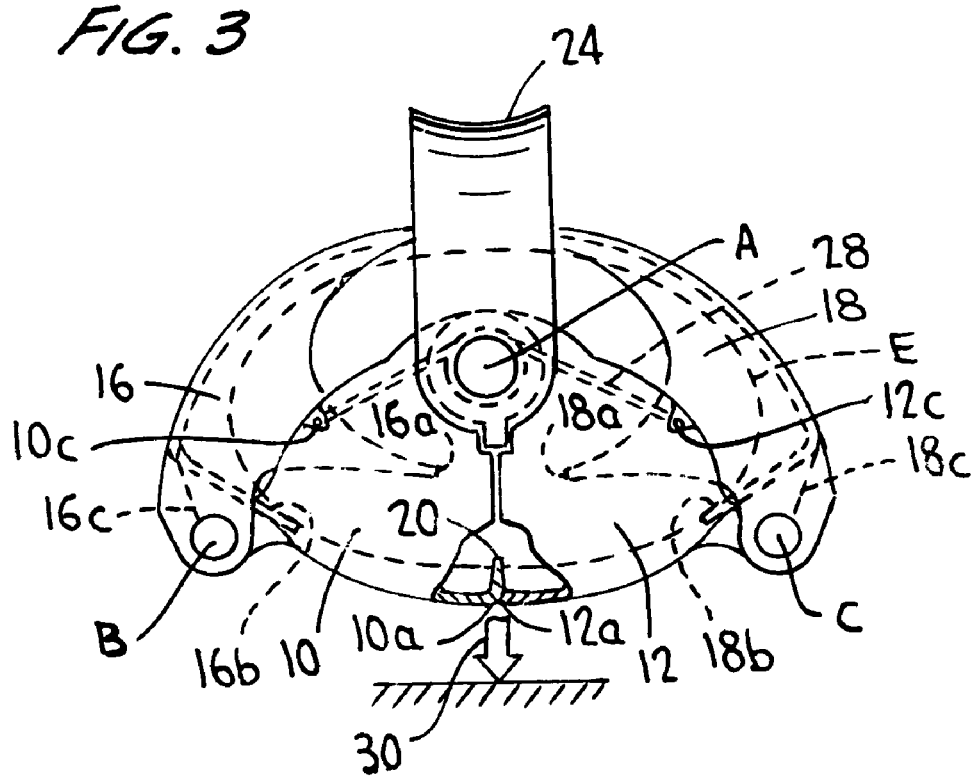
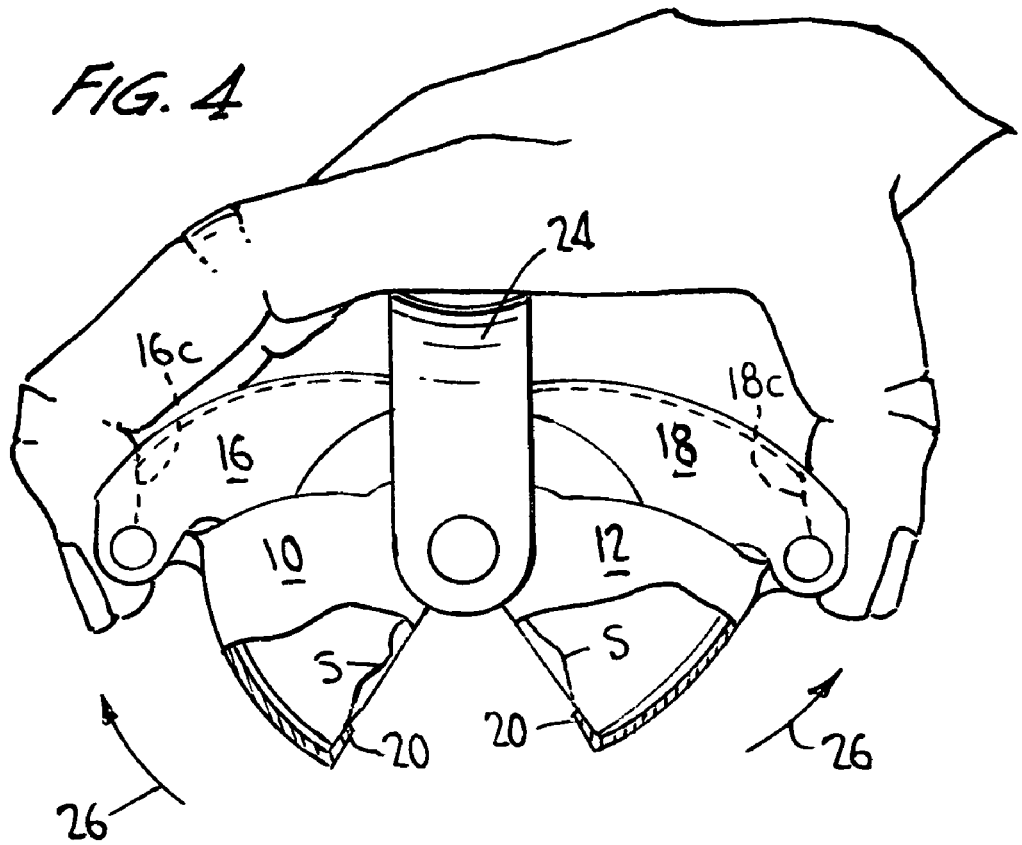

EGG BREAKER

FIELD OF THE INVENTION

This invention relates to a hand-operated tool for conveniently breaking eggs such that the shell is opened uniformly, allowing the contents of the egg to be poured from the shell without shell fragments becoming mixed therewith.

BACKGROUND OF THE INVENTION

The prior art includes numerous patents directed to hand-operated tools for conveniently opening eggs. See generally Talbot U.S. Pat. No. 4,542,584, Donovan U.S. Pat. No. 1,590,813 and Tomola U.S. Pat. No. 2,612,921. Also generally pertinent are Schneider 824,748, Romero U.S. Pat. No. 4,068,573, and Warren U.S. Pat. Nos. 4,137,837 and 4,137,838. However, as will appear below, the present invention includes material improvements over the tools shown in these references.

SUMMARY OF THE INVENTION

The tool of the invention comprises first and second complementary concave egg-receiving container members pivoted to one another at a first axis, and first and second concave egg-confining members each pivoted to one of the complementary concave egg-receiving container members at a respective axis parallel to the first axis. Egg-piercing points are formed on mating edges of the egg-receiving container members. In order to break and open an egg, the egg-receiving container members are first operated such that their mating edges are juxtaposed to one another, such that an egg-receiving cavity is formed therebetween. An egg is then placed in this cavity, and the egg-confining members are pivoted so as to confine the egg in the cavity. The tool and egg therein are then rapped sharply against a hard surface, such that the shell of the egg is pierced by the egg-piercing points, defining a separation line extending substantially circumferentially around the shell of the egg. The egg-receiving container members are then pivoted away from one another, by finger pressure applied to the egg-confining members The eggshell then parts along the separation line, allowing the contents to be poured out. Because the eggshell parts neatly along the separation line, shell fragments do not tend to become mixed with the contents of the shell. The empty shell halves can then be removed by pivoting the egg-confining members away from the respective container members.

A loop may desirably be provided extending between the pivot points at which the container members are pivoted to one another, providing a convenient bearing surface for the user's hand while the thumb and first or second finger engage the egg-confining members. Springs may be provided to bias the various components with respect to one another, simplifying operation. The egg-confining members may be provided with resilient fingers, so that eggs of various sizes can be securely received and reliably broken and opened.

BRIEF DESCRIPTION OF THE DRAWINGS

The invention will be better understood if reference is made to the accompanying drawings, in which:

FIG. 1 shows a perspective view of the tool of the invention;

FIG. 2 shows a cross-section along the long axis of the tool, with the tool in an egg-receiving configuration;

FIG. 3 shows a similar view with the tool in a configuration prior to breaking the egg; and FIG. 4 shows a similar view with the tool in a shell-opening configuration, and illustrates the manner in which the user can conveniently grip the tool for breaking and opening an egg.

DESCRIPTION OF THE PREFERRED EMBODIMENTS

As indicated above, FIG. 1 shows a perspective view of the tool of the invention. As illustrated, the tool comprises first and second complementary concave egg-receiving container members 10 and 12; these are substantially mirror images of one another, so that the tool is essentially symmetrical. These members 10 and 12 may be made of stainless steel. Members 10 and 12 are pivoted to one another at a pivot axis A defined by the respective location of rivets 14, so as to be pivoted toward one another to take an egg-receiving configuration, shown in FIG. 2, and an egg-opening configuration, shown in FIG. 4. More specifically, the container members 10 and 12 define mating edges 10a and 12a respectively, which are juxtaposed to one another in the egg-receiving configuration and spaced from one another in the egg-opening configuration.

As shown, the inner surfaces of container members 10 and 12 are generally concave, so that when in the egg-receiving configuration of FIG. 2 their interior surfaces substantially conform to the surface of the egg. Those of skill in the art, noting that eggs vary substantially in size, will recognize that the inner surface of the container members cannot conform precisely to all eggs. Noting further that an egg is asymmetrical about a plane transverse to its longitudinal axis, having a longer end and a shorter end, and given that it is desirable that the egg can be inserted into the symmetrical tool in either orientation, it will be further appreciated that the egg fits only approximately within the container members 10 and 12 in the egg-receiving configuration.

Also shown in FIG. 1 are opposed mirror-imaged egg-confining members 16 and 18, which can be formed of food-grade plastic, e.g., by injection molding. Egg-confining members 16 and 18 are pivoted to the respective container members 10 and 12 by rivets 22 extending through ears 10d, 12d formed on container members 10 and 12. As illustrated, ears 10d, 12d define pivot axes B and C that are parallel to first pivot axis A but spaced therefrom. As illustrated by comparison of FIGS. 2 and 3, the egg-confining members 16 and 18 are pivoted away from one another (FIG. 2) to allow an egg to be inserted into the tool, and are pivoted toward one another (FIG. 3) to retain the egg in a desired position with respect to the container members 10 and 12.

As illustrated, the egg-confining members 16 and 18 are generally concave to the inside so as to fit loosely around eggs of different sizes, and may comprise lateral tangs 16a, 18a and inwardly-extending resilient fingers 16b, 18b to further confine an egg. As illustrated more clearly in FIGS. 2-4, egg-confining members 16 and 18 are also formed to comprise finger-receiving recesses 16c, 18c on their outer surfaces. These recesses allow the user to readily grasp the egg-confining members, so as to open the tool and pour out the contents of the egg.

Egg-piercing points 20 are formed on the mating edges 10a and 12a of container members 10 and 12, and extend upwardly, toward the axis of an egg when received by the container members. Points 20 are arranged so as to lie in a plane when container members 10 and 12 are urged together, so that when they pierce an egg a separation line extending circumferentially around the egg is formed, dividing the shell neatly into two parts and avoiding the formation of small shards of eggshell.

Finally, also shown in FIG. 1 is an optional loop member 24, which extends between rivets 14 defining first pivot axis A. As will appear below, loop 24 is useful in enabling the user to conveniently employ the tool of the invention. Loop 24 may comprise tangs 24*a* extending inwardly between notches 10*b*, 12*b* formed in container members 10 and 12 so as to retain loop 24 in the proper position with respect to container members 10 and 12.

FIGS. 2-4 illustrate the sequence of operation whereby an egg is conveniently cracked and opened using the tool of the invention. As shown in FIG. 2, the user initially operates the tool so as to pivot container members 10 and 12 toward one another, specifically so that their mating edges 10*a* and 12*a* are juxtaposed to one another and so that points 20 lie essentially in a plane through which the long axis of the egg E will pass when placed between the container members. The egg-confining members 16 and 18 are then pivoted about axes B and C, away from one another, so that the egg E can be placed between container members 10 and 12, under loop 24 (if provided).

As illustrated by FIG. 3, the egg-confining members 16 and 18 are then pivoted toward one another, about axes B and C; tangs 16*a*, 18*a* and resilient fingers 16*b*, 18*b* keep the egg E in its proper position, over points 20.

As shown in FIG. 4, the user can conveniently hold the tool by placing the tip of the thumb of one hand in the finger-receiving recess of one egg-confining member (e.g., recess 18*c*) and the tip of the index or second finger in the corresponding recess of the other (in the example, recess 16*c*) so that the loop 24 bears against the inner surface of the hand. To initially crack the egg, the user then raps the tool and egg firmly against a hard surface, as indicated by arrow 30, such that the inertia of the egg E causes the egg-piercing points 20 to penetrate the shell of the egg E. As the points 20 are essentially coplanar the eggshell is thereby cracked along a separation line S (shown in FIG. 4) that extends essentially circumferentially around the egg E.

As illustrated in FIG. 4, the user then pivots the container members 10 and 12 away from one another, by pulling upwardly and outwardly on the egg-confining members 16 and 18, as indicated by arrows 26; as the loop 24 bears against the inner surface of the hand, force thus exerted on the egg-confining members 16 and 18 causes the container members 10 and 12 to be pivoted about first pivot axis A. The egg-piercing points 20 grip the edges of the halves of the shell and separate it neatly along the separation line S as the container members 10 and 12 are pivoted away from one another, so that the contents of the egg pour out.

Thus, it can be appreciated that according to the invention, an egg to be cracked and opened using the tool of the invention is first supported by the container members 10 and 12. The egg is retained in the cavity formed between members 10 and 12, over the egg-piercing points 20, by the egg-confining members 16 and 18, and to a degree also by hoop 24. The egg is then cracked by the user rapping the tool against a hard surface, so that the points pierce the egg, dividing the shell neatly along a separation line. The user then opens the egg by pivoting the mating edges of the container members away from one another; the points pull the lower edges of the two halves of the eggshell apart, so that the contents pour out.

Those of skill in the art will recognize that numerous additions and improvements can be made to the tool of the invention without departure from the essential spirit and scope of the invention. For example, it may be desirable to provide springs biasing the container members 10 and 12 apart, to simplify opening of the egg. Such a spring is shown schematically at 28 in FIG. 3; the loop of the "hairpin"-type spring shown could readily be secured around the rivet 14 on either or both sides of the assembly of the container members and hoop, and the ends of the spring(s) retained by tabs 10*c*, 12*c* formed on the opposed edges of the container members 10 and 12.

What is claimed is:

1. A tool for breaking and opening an egg comprising contents in a shell, comprising:

a pair of complementary concave egg-receiving container members pivoted to one another at a first axis extending transverse to an egg-receiving cavity defined by said pair of complementary concave members, said complementary concave egg-receiving container members each having a mating edge, such that said mating edges are juxtaposed to one another when said complementary concave egg-receiving container members are pivoted toward one another about said first axis to define an egg-receiving configuration, and wherein said complementary concave egg-receiving container members can be pivoted away from one another about said first axis so to separate said mating edges from one another to define an egg-opening configuration, one or more egg-piercing members extending from an inner surface of each of the respective complementary concave egg-receiving container members toward the central axis of an egg when received by the egg-receiving cavity defined by said complementary concave members, a pair of concave egg-confining members each pivoted to one of said complementary concave egg-receiving container members at a respective axis parallel to said first axis and spaced from said mating edges thereof, such that said egg-confining members can be pivoted toward one another in order to confine an egg between them and within said egg-receiving cavity defined by said complementary egg-receiving container, members when in said egg-receiving configuration, and such that said concave egg-confining members can be pivoted away from the respective ones of said complementary concave egg-receiving container members in order to allow an egg to be placed between said complementary concave egg-receiving container members or withdrawn therefrom, whereby in order to break an egg the egg is placed in said egg-receiving cavity between said complementary egg-receiving container members when in said egg-receiving configuration, said egg-confining members are pivoted toward one another so as to confine the egg, and the assembly of the tool and egg are rapped against a hard surface, so that said egg-piercing points pierce the shell of the egg and define a separation line, and whereby in order to open the egg and allow the contents of the egg to be poured out of the shell, the complementary egg-receiving container members are pivoted away from one another about said first axis, such that their mating edges are spaced from one another, separating the shell along a separation line defined by the relative location of said egg-piercing points, and allowing the contents of the shell to be poured out.

2. The tool of claim 1, further comprising a loop member extending over said egg-receiving cavity defined by said complementary concave egg-receiving container members and pivoted thereto at said first axis.

3. The tool of claim 1, wherein said egg confining members are formed to comprise concave outer gripping surfaces to receive the fingertips of a user, while said loop bears against the inner surface of the user's hand, so as to pivot said complementary egg-receiving container members away from one another about said first axis and open the egg.

4. The tool of claim 1, wherein said egg-piercing points are disposed along said mating edges of said complementary egg-receiving container members.

5. The tool of claim 4, wherein said egg-piercing points are substantially aligned with one another when said complementary egg-receiving container members are disposed in said egg-receiving configuration, whereby when an egg is cracked by said egg-piercing points a substantially circumferential parting line is established around the shell of said egg.

6. The tool of claim 1, wherein at least one spring is provided to bias the complementary egg-receiving container members away from one another.

7. The tool of claim 6, wherein two said springs are provided, each of said springs being a hairpin spring comprising a loop retained at the pivot point defining said first axis about which said complementary egg-receiving container members pivot with respect to one another.

8. The tool of claim 1, wherein said concave egg-confining members comprise resilient fingers adapted to allow eggs of differing sizes to be securely retained in said egg-receiving cavity.

* * * * *